J. Kingsland Jr.
Pulp Grinder.
No. 1,380. Reissued Jan. 6, 1863.
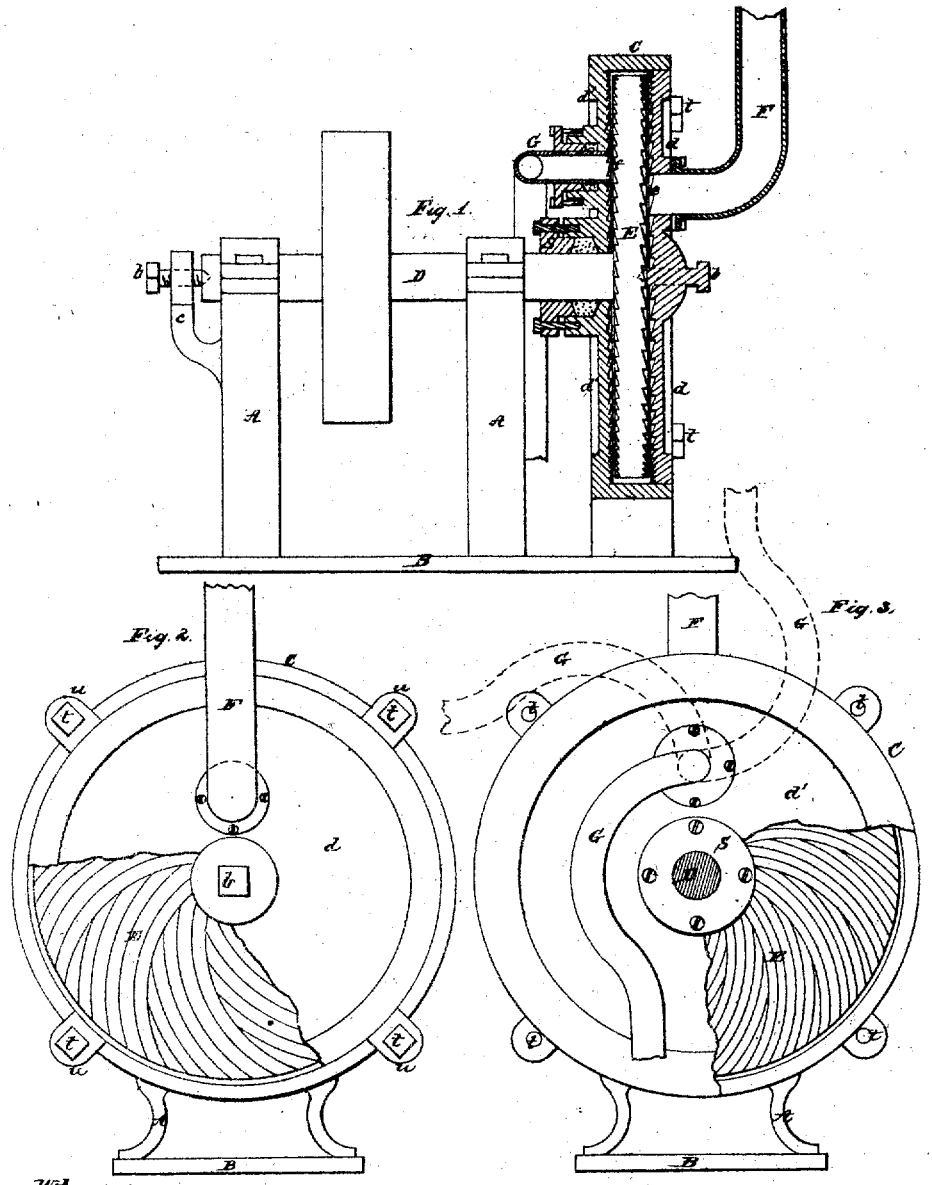
Witnesses
Inventor

UNITED STATES PATENT OFFICE.

JOSEPH KINGSLAND, JR., OF FRANKLIN, NEW JERSEY.

IMPROVEMENT IN MACHINERY FOR GRINDING PAPER-PULP.

Specification forming part of Letters Patent No. 16,239, dated December 16, 1856; Reissue No. 745, dated June 28, 1859; Reissue No. 1,380, dated January 6, 1863.

*To all whom it may concern:*

Be it known that I, JOSEPH KINGSLAND, Jr., of Franklin, in the county of Essex and State of New Jersey, have invented certain new and useful Improvements in Machinery for Reducing Fibrous Substances into Pulp for the Manufacture of Paper; and I do hereby declare that the following is a full, clear, and exact description thereof, reference being had to the accompanying drawings, making part of this specification, in which—

Figure 1 is a longitudinal vertical section of the machine; Fig. 2, an elevation of one end with part of one head cut away to represent the teeth inside, and Fig. 3 an elevation of the other end with part of the head cut away for the like purpose.

The same letters indicate like parts in all the figures.

The stock from which paper is made usually consists of rags, although in some instances fibrous substances which have not been worked into fabrics are employed for this purpose; but whatever the stock may be the fibers usually vary in strength and in fineness. These fibrous substances for the manufacture of paper are reduced to what is known as "pulp" by grinding or beating them in water.

It is well known, and has long been admitted, that the process heretofore practiced for reducing rags and other fibrous matter into pulp for the manufacture of paper is defective. By such process the whole batch of fibers to be reduced and floating in water is caused to circulate in the annular trough or vat of what is termed the "pulp-engine," by the rotation of the beating or grinding cylinder, and, as all the fibers of a batch, with the water in which they are suspended, pass in their circuit an equal number of times between the concave and cylinder, where the blades or knives do the beating, it follows that although in the process a portion, more or less considerable, of the fibers may become sufficiently beaten to be of the proper consistency that portion must still continue to be subjected to the beating process until the more refractory fibers become sufficiently reduced, and it follows as a necessary consequence that the less refractory and smaller ones are too much reduced. It is by reason of this defect that the paper-maker has found it so difficult to make paper of uniform texture. Besides, this old process necessitates the use of engines of great bulk, occupying a large extent of floor-space, which adds greatly to the cost of a paper-mill. To avoid the defects of this old process it has been proposed to feed or discharge a stream of water and fibers onto the horizontal face of a rotating wheel having a conical periphery armed with suitable beating or grinding blades and surrounded by a trough-like stationary curb, with its lower part of a conical form corresponding to the periphery of the wheel and in like manner armed with beating or grinding blades, so that the fibers suspended in water should be reduced to the required extent by passing once only between the beating or grinding surfaces. But this mode of operation, so far as I am informed, has never been adopted and is obviously defective, for the reason that it does not provide for retaining the fibers a sufficient length of time under the beating or grinding action to effect their reduction to pulp, and as the discharge is at the periphery and the beating or grinding blades in some form must extend from the inner to the outer periphery, and on conical surfaces having a vertical axis of rotation, gravity and centrifugal force will concur in carrying the fibers and water through the lands or furrows between the blades, thereby causing the fibers to escape the beating or grinding action of the blades.

I have invented a new process, not herein claimed, however, which avoids the defects heretofore experienced, which process consists in subjecting the fibers suspended in water to a beating, reducing, or grinding action in a closed reservoir containing the beaters, and provided with an aperture for the continuous feeding in of the mixed fibers and water, and an aperture for the continuous overflow of the beaten pulp, the current of suspended fiber and water through said reservoir being induced and regulated by the conjoint action of the beating operation and the hydrostatic pressure of the columns of induction and eduction; and the invention which I desire to secure by these Letters Patent is an engine whose mode of operation works the said process so invented by me, but not herein claimed.

The characteristic feature of the said engine is the inclosing of the rotating beater armed with blades or teeth suitable for reducing fibrous substances to pulp adapted to the making of paper, within a surrounding reservoir which holds a portion of water-bearing fibers to be reduced suspended therein, this reservoir being provided with feeding-in and discharging apertures, so that by the centrifugal force due to the beating action a current of water shall be induced into, through, and out of the said reservoir, to carry the fibers, so soon as they are sufficiently reduced, away from the influence of the beating action, the discharge from the said reservoir being so checked or controlled as to prevent the current of water passing through the reservoir from carrying the fibers through the lands or furrows between the blades to the discharge before they are sufficiently reduced. This mode of operation is distinguished from the old pulp-engine in that there is a reservoir which contains only a portion of a batch of fibers, and the current induced therein is from the feeding-in to the discharge aperture to carry away and discharge the fibers so soon as they are sufficiently reduced, leaving such as are not reduced under the beating action, instead of returning the whole to the beating action until the fibers are reduced; and it is distinguished from the other mode of operation above referred to in that the beating action on the fibers takes place within an inclosing reservoir, and that the discharge of the water and fibers is from the delivery-aperture of the reservoir, instead of being directly from between the beating-surfaces, from which it results that the fibers are retained within the influence of the beating action until, and only until, sufficiently reduced, and are then carried off by the current of water to the discharge-aperture.

In the accompanying drawings, B represents a bed-plate, which supports two standards, A A, and a hollow cylindrical reservoir or case, C. In a line with the axis of this cylinder a shaft, D, is mounted in bearings in the standards A A. In a bracket, *c*, on the outer standard, A, and in a boss at the middle of the outer head, *d*, of the cylindrical reservoir C, set-screws *b* are placed in a line with the axis of the shaft D. The object of these set-screws is to adjust the nut within the reservoir, and to permit it, if desired, to have a regulated amount of end play for a purpose which will be presently described. This shaft passes through a stuffing-box, S, on the inner head, *d'*, of the reservoir C, and extends within it toward its outer head, *d*. This projecting end of the shaft D carries the nut, in the form of a disk, E, at right angles with the shaft and concentric with it and with the cylindrical reservoir. This disk is somewhat less in diameter and thickness than the interior of the cylinder, so as to leave between it and the heads and periphery of the cylinder a space for a current of water and rags, half-stuff, or paper-pulp to flow through.

The outer head, *d*, is made separate from and properly fitted to the inner bore of the cylinder, so that it can slide therein for adjustment, and it is connected with and secured to the cylinder by means of screw-bolts *t*, passing through ears *u* projecting from the periphery, and tapped into corresponding ears projecting from the cylinder, which is cut out at suitable places to receive the ears of the head *d*. By the means described the space between the two heads can be readily adjusted to the thickness of the nut, as also the position of the nut relatively to the two heads.

The inner surface of the heads of the cylinder and the two faces of the disk are grooved in the manner represented to form cutting edges or blades of any suitable kind for working fibers into pulp; or separate blades may be inserted, those on the head *d* and corresponding face of the nut being made larger and deeper than on the head *d'* and corresponding face of the nut.

An orifice is made in each head of the cylinder. The orifice in the outer head, *d*, which is the feeding-in side of the reservoir, is connected, by a pipe, F, with a tank above containing the fibrous substance mingled with water and ready to be reduced to pulp. With the orifice in the inner head, *d'*, which is the discharge-orifice, a pipe, G, is connected, which conducts off to a proper receptacle the pulp discharged from the machine; and this discharge-pipe is bolted or otherwise so secured to the case that it may, if desired, be set with its discharging end at different elevations.

The operation is as follows: Rotary motion is communicated to the shaft D through the pulley near its middle, and the set-screws *b* are so adjusted as to allow the shaft to have a slight end play to permit the disk E to run freely and yield slightly and adapt itself to the beating; but, if desired, the disk E may be set so as to run without end play. The fibrous substance and water may be now let into the feed-pipe F from the tank above, and if the head be sufficient the hydrostatic pressure will force it into the cylindrical reservoir through the space *e* between the disk and the outer head, *d*, around the periphery of the disk, and through the space *f* toward the orifice of the discharge-pipe G, where it will flow over into any suitable receptacle. The centrifugal action of the disk will co-operate with the hydrostatic pressure of the column in the feed-pipe F to induce a current from the feed-orifice toward the periphery; but when the current of water charged with fibers turns the periphery of the disk and enters the space *f* on the opposite side, its passage to the discharging orifice is retarded by the centrifugal action of the disk; but as the blades on that side are smaller than on the feeding-in side, the centrifugal force due to the rotation will predominate on the feeding-in side and will aid in inducing a current toward the discharge-orifice and between the beating-surfaces. The mechanical force being modified by the relative height of the induction and eduction columns, raising the discharging orifice as provided will retard the current, and lowering it will accelerate the current. The current of water thus induced tends to carry the fibers between the beating-surfaces toward the discharge-aperture, and so soon as any of the fibers are reduced to the required degree of fineness they travel, with small impediment, to the discharge-aperture, while the more refractory or larger fibers are held back for a longer time by the beating or reducing action of the blades. In this way the fibers are retained in the reservoir as long as it is necessary to reduce them to the required degree of fineness, and no longer, for so soon as they are sufficiently reduced to pass freely between the blades they follow the current and flow out, instead of being retained until the more refractory ones are reduced. But to effect the object contemplated by me, it will be seen that it is necessary to check the discharge. If, for instance, the discharge aperture were placed at the bottom of the reservoir and made of sufficient size to permit a free discharge of the water and the fibers, the grinding action alone would not be sufficient to check or hold back the refractory fibers, and in consequence they would be carried through in the lands or furrows between the blades by the current and discharged before being properly reduced; but by placing the discharge-aperture at some distance above the bottom the current is so far checked that the fibers can be retained under the beating or reducing action until properly reduced. Again, if there were no inclosing reservoir, and the fibers and water were discharged freely at the periphery of the rotating beaters, the current would flow through the lands or furrows between the blades and the fibers would fail to be properly reduced.

I have found the placing of the discharge-aperture from the reservoir a little above the shaft to work well, but the relative height of the feeding and discharging heads will always depend upon the tendency of the mechanical action of the machine to work the current through it. When such tendency is great the discharging-head must be higher relative to the feeding-head, and vice versa.

The slower the motion of the current of water and fibers through the machine at any given velocity of the nut the finer will be the resulting pulp, the set of the rotating disk and the heads of the reservoir to each other being properly adjusted, so that by increasing or decreasing the force of the current or adjusting the nut and movable head the degree of fineness of the pulp can be regulated.

The construction and form above described I have found to work well in practice, but it will be obvious to the skillful mechanic, particularly if skilled in the art of manufacturing paper, that the form may be modified without changing the mode of operation which distinguishes my said invention from all other engines before known.

What I claim as my invention, and desire to secure by Letters Patent in an engine for reducing fibrous substances to pulp suitable for making paper, is—

The combination of a rotating nut armed with blades suitable for reducing fibrous substances to pulp, a reservoir for containing fibers and water and surrounding and inclosing the nut with its blades, a feeding-aperture through which the fibrous substances and water are to be introduced into the reservoir, a discharging-aperture to permit the escape of the water from the reservoir with the fibers when properly reduced and to check the discharge, that the fibers may be retained under the beating action until properly reduced, and the means for inducing a current through the reservoir, the whole having a mode of operation substantially as herein described, and for the purpose specified.

JOSEPH KINGSLAND, JR.

Witnesses:

WM. H. BISHOP,

A. DE LACY.